May 1, 1956 E. A. FERRIS 2,743,803
TORQUE LIMITING DEVICE
Filed Nov. 7, 1951 2 Sheets-Sheet 1
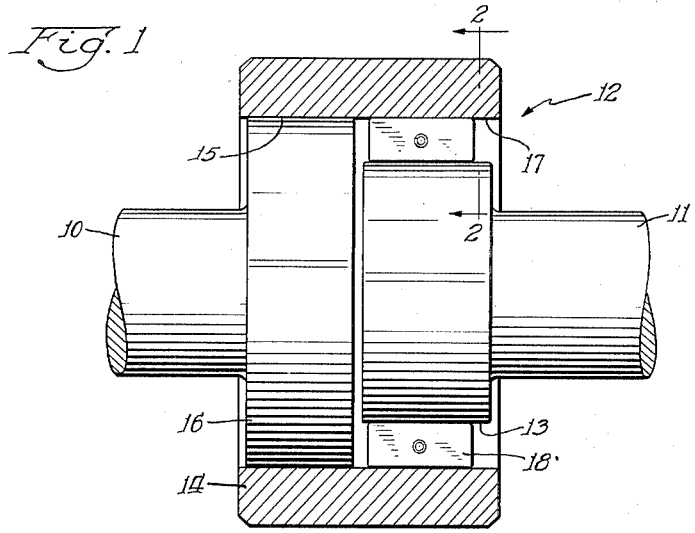
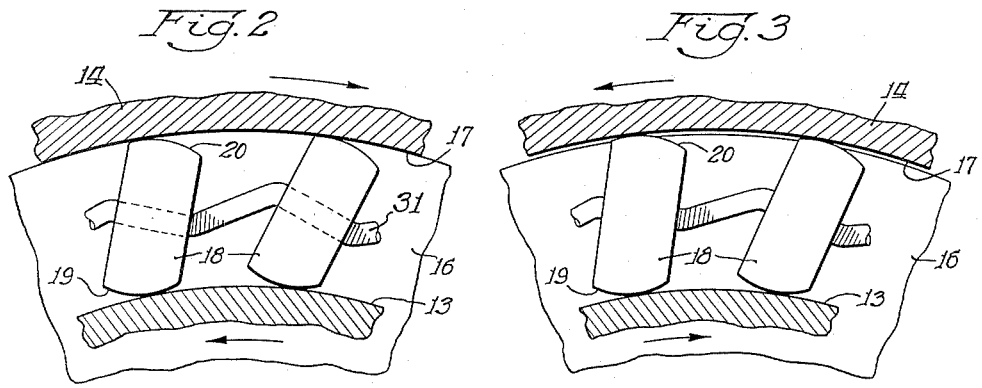
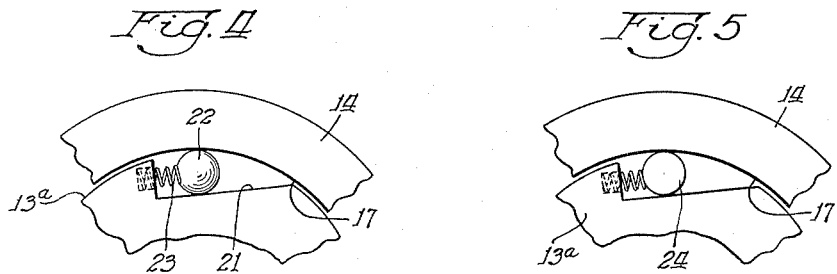
Inventor:
Ernest A. Ferris
By Frank C. Parker
Atty.

May 1, 1956  E. A. FERRIS  2,743,803
TORQUE LIMITING DEVICE
Filed Nov. 7, 1951  2 Sheets-Sheet 2
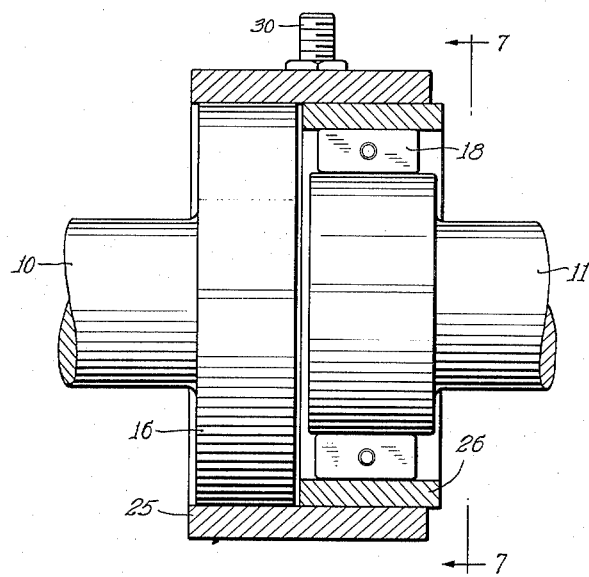
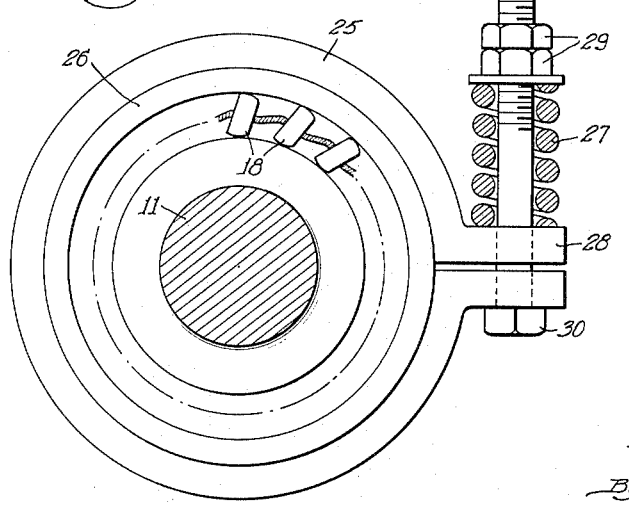
Inventor:
Ernest A. Ferris
By: Frank C. Parker
Atty.

United States Patent Office 2,743,803
Patented May 1, 1956

2,743,803

TORQUE LIMITING DEVICE

Ernest A. Ferris, Oak Park, Ill., assignor to Borg-Warner Corporation, Chicago, Ill., a corporation of Illinois Application November 7, 1951, Serial No. 255,301

9 Claims. (Cl. 192—41)

The present invention relates in its broadest aspects to torque transmitting devices and in particular to devices which are automatically operable to break a torque path between a pair of members when the torque transmitted therebetween exceeds a predetermined value.

The principal object of the present invention is to provide a torque limiting and transmitting device of the general character referred to above which is simple and cheap to manufacture and which readily lends itself to a multitude of different uses for which it may be applicable.

A more specific object of the invention is to provide a torque limiting device which utilizes a conventional one-way engaging mechanism between a pair of relatively rotatable members wherein the one-way engaging mechanism is directly disposed between one of the rotatable members and a third member frictionally connected with the other rotatable member.

In many of the well-known one-way engaging devices camming means are disposed between a pair of substantially concentric races and when the races tend to rotate relatively in one direction the camming means permit free relative rotation of the races and when the races tend to rotate relatively in the other direction the camming means wedgingly engage both races in order to connect them together for rotation in unison. During the wedging engagement of the camming means with the races the camming means tend to spread the races apart and in the present invention this inherent feature of operation of the camming means is utilized to oppose the force of frictional engagement between a relatively rotatable member and one of the races in a manner that will disengage this race from the member. Inasmuch as the force of wedging engagement between the camming means and the races is substantially proportional to the torque being transmitted between the races it will be apparent to those skilled in the art that when the transmitted torque reaches a predetermined value the force exerted by the camming means in wedgingly engaging the races will be sufficient to overcome the frictional engagement between the one race and the member to thereby limit the value of the torque transmittable between the relatively rotatable members.

More specifically, the present invention has for an object to provide a torque limiting device utilizing a sleeve which is press fitted onto one relatively rotatable cylindrical member, which sleeve comprises one race of a one-way engaging device, and a cylindrical portion formed on another member comprises the other race for the one-way engaging mechanism. With this construction a plurality of wedging elements positioned between the races function, when the rotatable members tend to rotate relatively in one direction to release the members and to wedgingly engage both races to lock the members together when they tend to rotate relatively in the other direction. The force of the wedging engagement tends to expand the sleeve, thereby causing it to become released from the rotatable member which it frictionally engages.

As illustrated in the different figures the present invention may be used in conjunction with one-way engaging structures utilizing substantially any type of wedging elements.

A further object of the invention is to provide a sleeve for connecting one of a pair of rotatable members with a one-way engaging device, wherein the sleeve is spring-pressed into frictional engagement with the member. Adjusting means are provided for varying the force applied by the spring and this makes it possible to vary the torque which may be carried by the device before the sleeve will slip with respect to the rotatable member with which it is in frictional engagement.

The foregoing objects and numerous advantages of the present invention will become apparent and the invention will be more readily understood from the following detailed description when read in conjunction with the accompanying drawings wherein:

Fig. 1 is a side elevational view, shown partly in section, of one form of the invention;

Fig. 2 is a sectional view taken substantially along the line 2—2 of Fig. 1 when the two races of the one-way engaging device are free to rotate relatively;

Fig. 3 represents a sectional view also taken along the line 2—2 of Fig. 1 and represents the conditions when the camming devices of the one-way engaging mechanism are in wedging engagement with both races;

Fig. 4 represents a fragmentary view showing the invention applied in conjunction with a ball-type one-way engaging device;

Fig. 5 represents a fragmentary view of the invention when utilized in conjunction with a one-way engaging device of the roller type;

Fig. 6 is a side elevational view of another modification of the invention;

Fig. 7 represents a sectional view taken substantially along the line 7—7 in Fig. 6.

With reference to the drawings wherein like reference numerals in the different views identify identical parts, and referring first to the embodiment of the invention disclosed in Figs. 1-3, a pair of transmitting members 10 and 11 are shown. A torque limiting and transmitting mechanism, identified generally by reference numeral 12 comprises an inner race 13 integrally formed on the member 11, a sleeve 14 press fitted, as indicated at 15, onto a cylindrical hub 16 formed on the member 10. A portion 17 of the sleeve 15 constitutes the outer race of a one-way engaging device comprising a plurality of tiltable grippers or wedging devices 18 disposed between the races 13 and 17 and biased toward engagement therewith by a suitable spring 31.

It is contemplated that either member 10 or 11 may be considered as the driving member with the other being the driven member, each may be considered to be individually rotatable, and also, if desired, either one of the members 10 or 11 could be stationary so that the torque limiting and transmitting mechanism 12 would then be a one-way brake.

Referring to Figs. 2 and 3, the wedging devices 18 are formed with eccentric cam surfaces 19 and 20 which respectively contact the races 13 and 17. When the wedging devices 18 are tilted slightly clockwise, as shown in Fig. 2, the two races 13 and 17 are not locked together by the cams 19 and 20 and under this condition there may be relative movement of the race 17 in a clockwise direction with respect to the race 13. The condition disclosed in Fig. 2 represents an overrunning condition which prevails whenever the race 17 tends to rotate clockwise relative to the race 13 or whenever the race 13 tends to rotate counterclockwise relative to the race 17. The conditions represented by Fig. 3 occur when the race 17 tends to rotate counterclockwise relative respectively to the other race. Under these conditions the sprags or wedging devices 18 tilt slightly in a counterclockwise direction to wedgingly engage both races 17 and 13. The sprags 18 engage the races 17 and 13 with a force which is substantially proportional to the torque being transmitted from one race to the other and this force acts in such a manner as to tend to spread the races 13 and 17 apart. In the embodiment of the invention disclosed in Figs. 1–3 the race 13 comprises a substantially solid cylindrical member which is quite resistant to compression and accordingly the sprags can more easily expand the outer race 17 and sleeve 14. When the expansion of the sleeve 14 becomes sufficiently great, the sleeve 14 no longer engages the hub 16 with sufficient frictional force to transmit the torque from the sleeve to the member 10. At this time the sleeve 14 and member 11 slip relative to the member 10 thereby providing a limit to the amount of torque which can be transmitted between the members 10 and 11. After the wedging devices 18 no longer transmit this excessive amount of torque, the force applied thereby to sleeve 14 will be reduced and the sleeve 14 will return to its position of tight engagement with the hub 16.

Turning now to Fig. 4, which shows a ball type engaging device for replacing the wedging device of Fig. 1, the sleeve 14 has the race 17 and a race 13a integrally formed on the member 11 is provided with a plurality of cam pockets 21. Within each of the cam pockets 21 a ball or spherical member 22 is positioned and a compression spring 23 continuously urges each of the balls 22 into wedging engagement with both races 13a and 17. When the sleeve 14 tends to rotate clockwise with respect to the race 13a the balls 22 become wedged between the races to thereby connect them for rotation together in unison. When the sleeve 14 tends to rotate counterclockwise relative to the race 13a this effects a counterclockwise movement of the balls 22 against the action of the springs 23 to effect disengagement of the races. The principle of operation of the structure disclosed in Fig. 4 is substantially identical with that disclosed in Figs. 1–3 and further description thereof is not deemed necessary.

In Fig. 5 the construction is identical with that disclosed in Fig. 4, with the exception that the balls 22 have been replaced by cylindrical roller elements 24 and it is not considered necessary to describe this form in further detail.

Figs. 6 and 7 utilize the sprags 18; however, the sleeve 14 has been replaced by a split ring 25 and a cylindrical ring 26 forming the outer race for the structure. In this construction the race 26 expands quite readily and a rather heavy compression spring 27 continuously tends to contract the split ring 25 into frictional engagement with the member 16, due to the biasing force of the spring 27 exerted between one end 28 of the split ring 25 and a nut 29 on a bolt 30 extending through apertures formed in both ends of the split ring 25. During the operation of the mechanism disclosed in Figs. 6 and 7 the wedging engagement between the sprags 18 and the races causes the ring 26 to expand quite easily; however, this expansion is prevented by the spring 27 which tends to hold the split ring 25 in frictional engagement with the hub 16. It will be understood, however, that with increasing torque being transmitted between the races the sprags 18 tilt further and exert a greater force in opposition to that of the spring 27 and when the torque reaches a predetermined value it is sufficient to expand the split ring 25 to such an extent that it is no longer drivingly connected with the hub 16. By adjusting the position of the nut 29 on the bolt 30, the degree of compression of the spring 27 can be varied and consequently the force of frictional engagement between the ring 25 and the hub 16 can be varied. As a result, with an increased frictional engagement between the ring 25 and hub 16 due to further compression of the spring 27 a greater torque must be transmitted in order to disconnect the sleeve 25 from the hub 16.

As will obviously be apparent from the foregoing disclosure the present invention provides a simple and cheap torque limiting and transmitting mechanism utilizing a principle inherent in one-way engaging devices of the different types disclosed herein, this principal being that the force exerted during the wedging engagement between the camming devices and the races tends to spread the races apart and by having one of the races press fitted on to one of the torque transmitting members the expansion of the race can be utilized to overcome the press fit when the transmitted torque reaches a predetermined value.

It is contemplated that numerous changes and modifications may be made in the invention without departing from the spirit or scope thereof.

What is claimed is:

1. In a torque transmitting device, the combination of a driving member, a driven member, expansible means normally connected with one of said members for transmitting torque to and from the member, and wedging means operably connected between the other member and said expansible means for transmitting torque between the other member and said expansible means and effective when the torque reaches a predetermined value to expand said expansible means to break the connection thereof with said one member.

2. In a device for transmitting torque between a pair of rotatable shafts, means connecting the shafts for rotation together in unison and comprising a member releasably connected with one of the shafts and wedging means disposed between said member and the other shaft, said wedging means adapted and arranged to disengage the other shaft from said member upon relative rotation between the shafts in one direction and to engage the other shaft with said member upon relative rotation between the shafts in the other direction, said wedging means tending to expand said member in accordance with the torque transmitted between said shafts and when the torque reaches a predetermined value the expansion of said member being sufficient to break the connection between said member and said one shaft.

3. In a torque limiting device, the combination of a pair of relatively rotatable members, means defining a race on one of said members, a collar disposed in frictional engagement with the other of said members and including means defining a race concentrically mounted with respect to said first named race, and wedging means disposed between said races for wedgingly engaging the races and transmitting torque between said members when the members tend to rotate relatively in one direction, said wedging means engaging said races with a force substantially proportional to the torque transmitted between the members which force acts in a direction tending to spread the races apart and disengage said collar from said other member when the torque reaches a predetermined value.

4. In a torque limiting and transmitting mechanism, the combination of a driving member including means defining a first raceway, a driven member, means concentrically mounted with respect to and frictionally engaging said driven member and including means defining a second raceway, and tiltable sprags disposed between said raceways for completing a torque path therebetween by wedgingly engaging said raceways with a force substantially proportional to the torque being transmitted, the force between said tiltable sprags and raceways tending to relatively spread the raceways and being effective upon the torque reaching a predetermined value to break the frictional connection between said concentrically mounted means and said driven member.

5. In a torque limiting and transmitting mechanism, the combination of driving and driven members, one of said members including means defining a first raceway, means concentrically mounted with respect to and normally frictionally connected with the other of said members, said last-named means including means defining a second raceway, and torque transmitting devices disposed between said raceways adapted and arranged to enable said members to rotate relatively in one direction and for wedgingly engaging both of said raceways to complete a torque path between the members when they tend to rotate relatively in the other direction, said devices wedgingly engaging said raceways with a force substantially proportional to the torque being transmitted which force tends to spread the raceways relatively, said force being sufficient when the transmitted torque reaches a predetermined value to break the frictional connection between said concentrically mounted means and said other member.

6. In a torque limiting and transmitting mechanism, the combination of driving and driven members, one of said members including means defining a first raceway, an expansible sleeve press fitted onto the other of said members and including means defining a second raceway, and torque transmitting devices disposed between said raceways for enabling said members to rotate relatively in one direction and for wedgingly engaging both of said raceways to complete a torque path between the members when they tend to rotate relatively in the other direction, said devices wedgingly engaging said raceways with a force substantially proportional to the torque being transmitted which force tends to expand said sleeve, said force being sufficient when the transmitted torque reaches a predetermined value to overcome the press fit between said sleeve and said other member.

7. In a torque limiting and transmitting mechanism, the combination of driving and driven members, one of said members comprising a plurality of parts joined by a releasable pressed fit, one of said parts and the other member each including means defining a raceway, one of said raceways comprising a cylindrical surface and the other comprising a generally cylindrical surface found with a plurality of cam pockets therein, and a plurality of roller members disposed in said cam pockets between the raceways for wedgingly engaging both raceways to complete a torque path between said members when the members tend to rotate relatively in one direction and for releasing the raceways when the members tend to rotate relatively in the opposite direction, said roller members exerting a force on the raceways during the wedging engagement which force is substantially proportional to the torque being transmitted, said force tending to spread the raceways apart and being sufficient when the transmitted torque reaches a predetermined value to release the pressed fit between the parts of said one member and break the torque path between said members.

8. In a torque limiting and transmitting mechanism, the combination of torque transmitting and torque receiving members, means for connecting said members for completing a torque path therebetween when the members tend to rotate relatively in one direction and for enabling the members to freely rotate relatively in the other direction, said means including a connecting device for frictionally engaging one of said members with a predetermined force when no torque is being transmitted between said members, a plurality of camming devices operatively disposed between and adapted to wedgingly engage the other of said members and said connecting device to complete said torque path when said members tend to rotate relatively in said one direction, said camming devices exerting a force on said connecting device substantially proportional to the torque being transmitted over said torque path and in opposition to said first-mentioned force and which is effective to overcome said first-mentioned force and disengage said connecting device from said one member when the transmitted torque reaches a predetermined value thereby limiting the torque transmittable between said members, said connecting device having a compression spring associated therewith for providing said predetermined force, and an adjusting device for varying the degree of compression of said spring to thus vary said predetermined force and change the limit of the torque transmittable between said members.

9. In a torque limiting device having a driving member and a driven member, annular expansible means having means defining an inner surface normally in engagement with one of said members, means on the other of said members defining a relatively unyielding surface disposed interiorly of said inner surface on said expansible means, relatively rigid wedging means disposed between and in engagement with both said inner surface and said unyielding surface whereby an intense wedging force applied by said wedging means to said inner surface of said annular expansible means will effect expansion of said expansible means and disengage said inner surface from said one of said members, and means including said wedging means constructed and arranged to prevent relative rotation of said inner and unyielding surfaces in one direction but permitting relative rotation between said inner and unyielding surfaces in the opposite direction.

References Cited in the file of this patent

UNITED STATES PATENTS

| | | |
|---|---|---|
| 545,017 | Hargraves | Aug. 20, 1895 |
| 1,555,939 | Brisbois | Aug. 6, 1925 |
| 1,846,745 | Merritt | Feb. 23, 1932 |
| 1,909,831 | Jensen | May 16, 1933 |
| 1,915,643 | Barnes | June 27, 1933 |
| 2,065,244 | Richards | Dec. 22, 1936 |
| 2,447,384 | Wolff | Aug. 17, 1948 |
| 2,668,426 | Hoover | Feb. 9, 1954 |

FOREIGN PATENTS

| | | |
|---|---|---|
| 710,060 | Germany | 1941 |